Patented Mar. 16, 1926.

1,576,767

UNITED STATES PATENT OFFICE.

CHAUNCEY C. LOOMIS, OF YONKERS, AND HORACE E. STUMP, OF BROOKLYN, NEW YORK, ASSIGNORS, BY MESNE ASSIGNMENTS, TO THE HEVEA CORPORATION, A CORPORATION OF NEW YORK.

PROTECTION OF PIPES BY USE OF LATEX.

No Drawing.   Application filed April 21, 1923.   Serial No. 633,776.

*To all whom it may concern:*

Be it known that CHAUNCEY C. LOOMIS and HORACE E. STUMP, citizens of the United States, residing in Yonkers and Brooklyn, respectively, in the counties of Westchester and Kings, respectively, and State of New York, have invented a new and useful Improvement in the Protection of Pipes by Use of Latex, of which the following is a specification.

This invention relates in general to the protection of pipes, and has more particular reference to the internal coating of same, both to insure hermetic sealing and to protect the pipes against corrosion in service.

A principal object of the invention is the provision for readily protecting water, sewer and other pipes by internally coating them with rubber, either before or after they are installed for use. Our invention contemplates the employment of latex, i. e. the natural juice or milky substance, as it is derived from the rubber plant or tree to effect the provision of an internal rubber coating for the pipes.

The latex is preferably pumped through the water pipes before or (and this is preferable) after assembly. The excess material is then drained away and air is blown through the pipes to dry and effect the final coagulation of the latex and its conversion into irreversible rubber. The latex is preferably vulcanized before application to the pipes but this vulcanization can, if desired, be readily obtained by incorporating with latex a quantity of sulphur, preferably colloidal, and then blowing hot air through the pipes to vulcanize the material. The latex may be vulcanized before application by merely incorporating sulphur in it and heating it before coagulation. While individual pieces of pipe can be readily treated in this manner by the manufacturer, the invention contemplates the employment of the process for the treatment of an entire water system of a house or apartment building after installation, so that the rubber coatings extend continuously across the pipe joints.

We claim:

1. The process of protecting pipes, which comprises, coating them internally with latex and coagulating the latex to form a rubber coating.

2. The process of protecting pipes, which comprises coating them internally with vulcanized latex, and coagulating or precipitating the latex to form an internal rubber protective coating.

CHAUNCEY C. LOOMIS.
HORACE E. STUMP.